(12) United States Patent
McNally

(10) Patent No.: US 6,284,182 B1
(45) Date of Patent: Sep. 4, 2001

(54) MOLDING PROCESS EMPLOYING HEATED FLUID

(75) Inventor: Douglas J. McNally, Chatham (CA)

(73) Assignee: Konal Engineering and Equipment Inc., Blenheim (CA)

( * ) Notice: Subject to any disclaimer, the term of this patent is extended or adjusted under 35 U.S.C. 154(b) by 0 days.

(21) Appl. No.: 09/301,399

(22) Filed: Apr. 28, 1999

Related U.S. Application Data

(63) Continuation-in-part of application No. 09/267,567, filed on Mar. 12, 1999, now abandoned.

(51) Int. Cl.$^7$ .............................. B29C 41/08; B29C 33/04
(52) U.S. Cl. ................. 264/306; 264/309; 264/DIG. 60; 425/144; 425/435; 425/470
(58) Field of Search .................................. 264/306, 309, 264/310, 312, 302, DIG. 60; 425/144, 435, 470

(56) References Cited

U.S. PATENT DOCUMENTS

| | | |
|---|---|---|
| 1,843,786 | 2/1932 | Robinson . |
| 2,588,571 | 3/1952 | Porter . |
| 2,964,798 | 12/1960 | Ferrell . |
| 3,315,016 | 4/1967 | Wersoksy et al. . |
| 3,493,994 | 2/1970 | Wersosky et al. . |
| 3,728,429 | 4/1973 | Colby et al. . |
| 3,775,590 | 11/1973 | Gartner . |
| 4,217,325 | 8/1980 | Colby . |
| 4,389,177 | 6/1983 | Colby . |
| 4,552,715 | 11/1985 | Ando et al. . |
| 4,610,620 | 9/1986 | Gray . |
| 4,621,995 | 11/1986 | Wersosky . |
| 4,623,503 | 11/1986 | Anestis et al. . |
| 4,634,360 | 1/1987 | Gray . |
| 4,664,864 | 5/1987 | Wersosky . |
| 4,683,098 | 7/1987 | Belleville et al. . |
| 4,718,140 | 1/1988 | Johnson . |
| 4,722,678 | 2/1988 | Wersosky . |
| 4,755,333 | 7/1988 | Gray . |
| 4,790,510 | 12/1988 | Takamatsu et al. . |
| 4,851,177 | 7/1989 | Gray . |
| 4,867,660 | 9/1989 | Nagase et al. . |
| 4,890,995 | 1/1990 | Gray . |
| 4,898,697 | 2/1990 | Horton . |
| 4,923,657 | 5/1990 | Gembinski . |
| 4,938,906 | 7/1990 | Brault . |
| 5,032,076 | 7/1991 | Jackson, Jr. . |
| 5,093,066 | 3/1992 | Batchelder et al. . |
| 5,094,608 | 3/1992 | Piazza et al. . |
| 5,106,285 | 4/1992 | Preston . |
| 5,221,539 | 6/1993 | Pallerberg et al. . |
| 5,290,499 | 3/1994 | Tischler . |
| 5,316,715 | 5/1994 | Gray . |
| 5,443,777 | 8/1995 | Mills . |
| 5,445,510 | 8/1995 | Jackson, Jr. . |
| 5,525,284 | 6/1996 | Grimmer . |
| 5,606,641 | 2/1997 | Bucaille . |
| 5,612,066 | 3/1997 | Swenson . |

FOREIGN PATENT DOCUMENTS

| | | |
|---|---|---|
| 5277513 | 7/1993 | (JP) . |
| 8020474 | 10/1996 | (JP) . |

*Primary Examiner*—Jan H. Silbaugh
*Assistant Examiner*—Stefan Staicovici
(74) *Attorney, Agent, or Firm*—Flynn, Thiel, Boutell & Tanis, P.C.

(57) ABSTRACT

A molding apparatus and method for forming a thermoplastic shell or skin product. The molding apparatus includes a hollow mold housing provided with a mold tool thereon, which together define a fluid chamber within the mold housing. A quantity of heated liquid is supplied at a predetermined or operating temperature to the chamber of the mold housing from a liquid supply via an elongate feed pipe until a rear surface of the mold tool is covered. The mold housing is then oscillated to uniformly distribute the heated liquid within the chamber and to effect uniform heating of the mold tool. Heating devices are located within the chamber of the mold housing to add heat to the liquid within the housing chamber to maintain a desired liquid temperature.

23 Claims, 9 Drawing Sheets

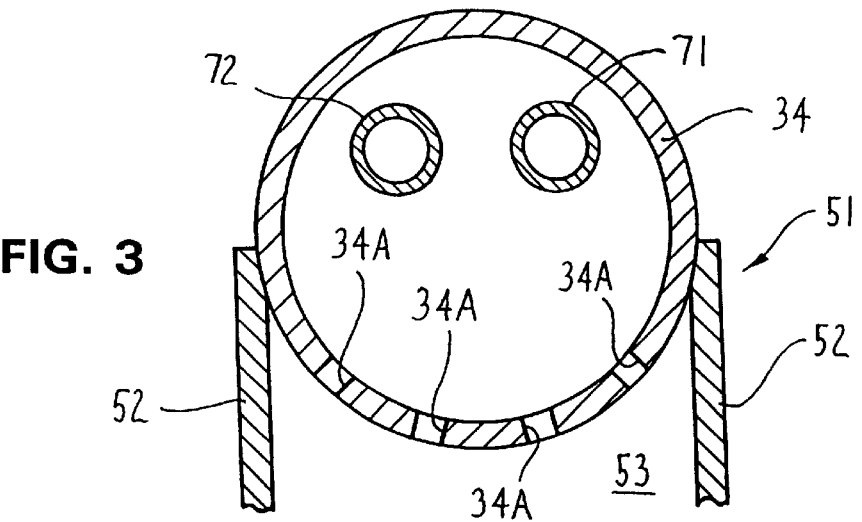
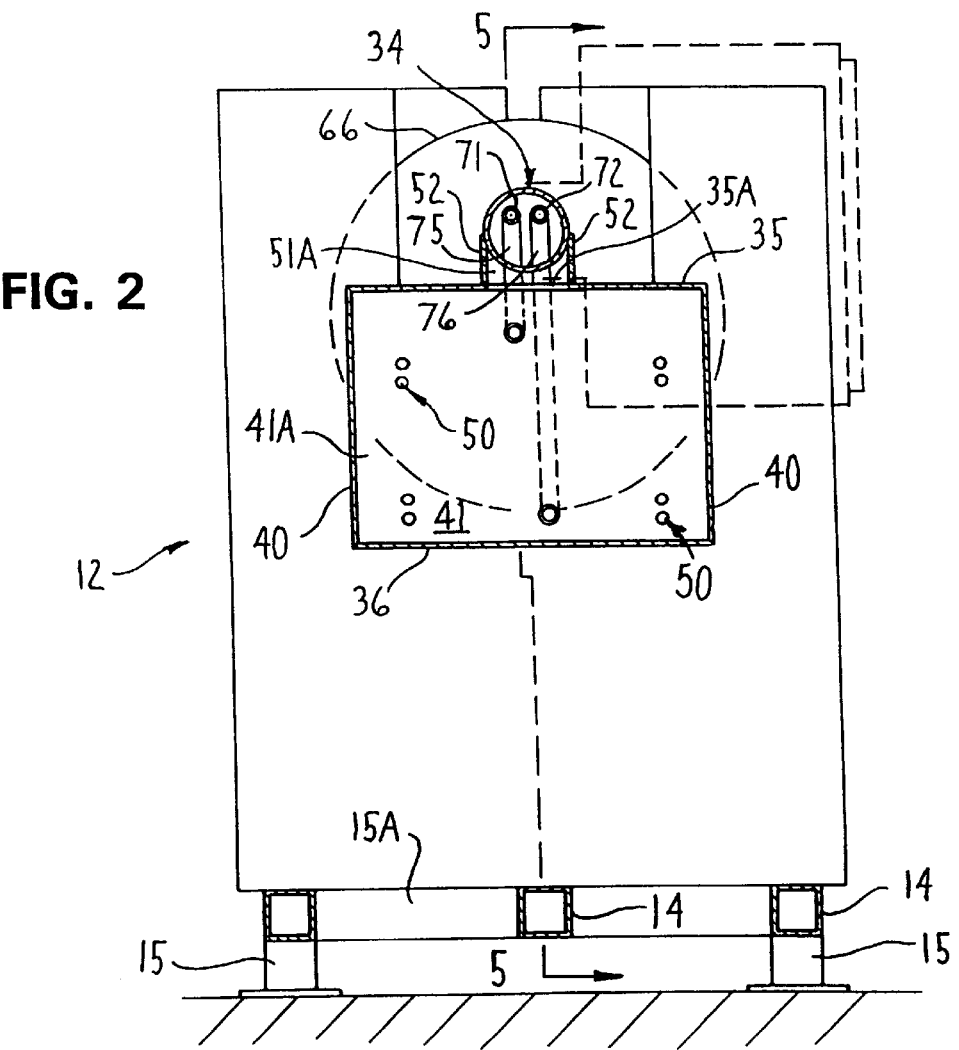

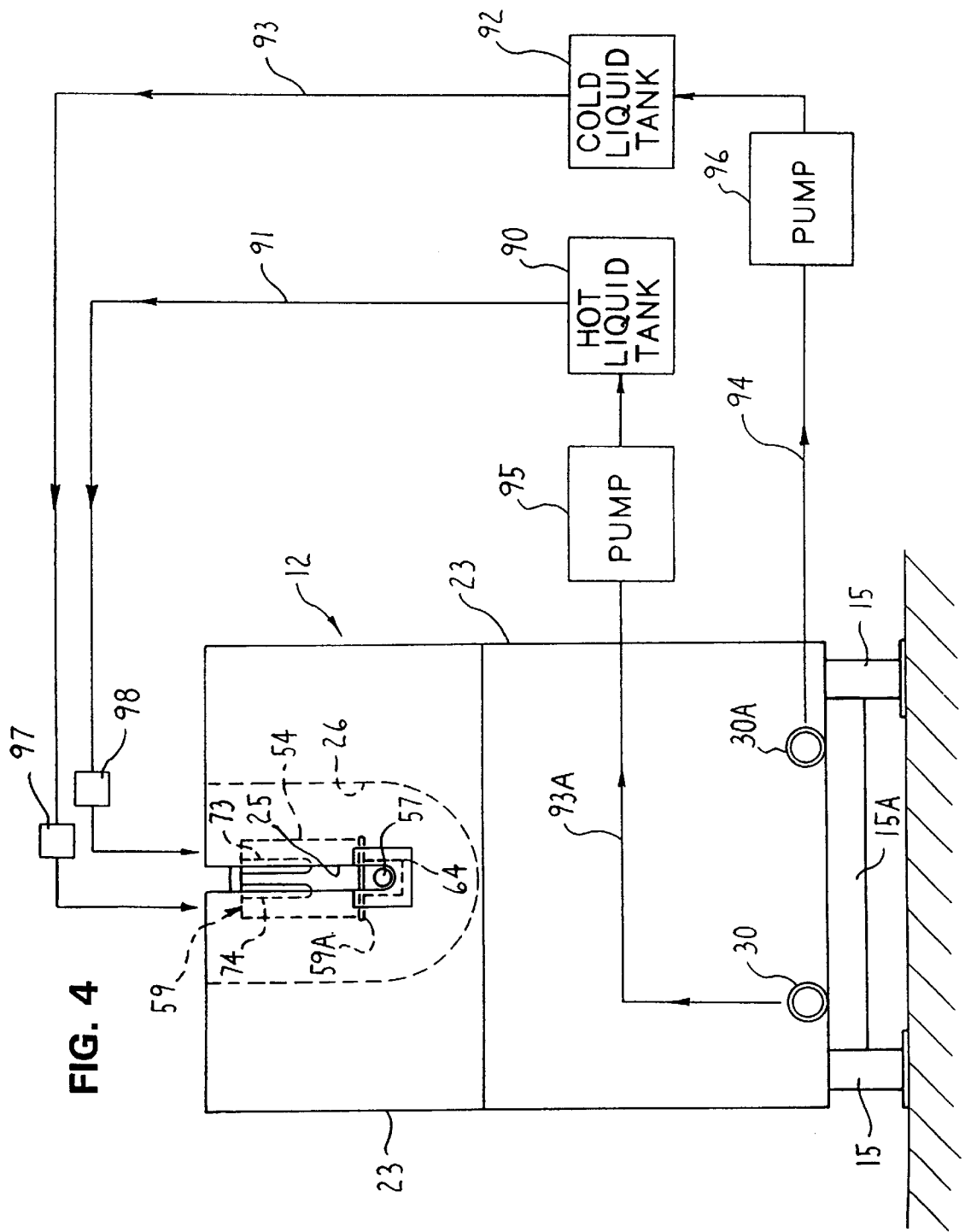

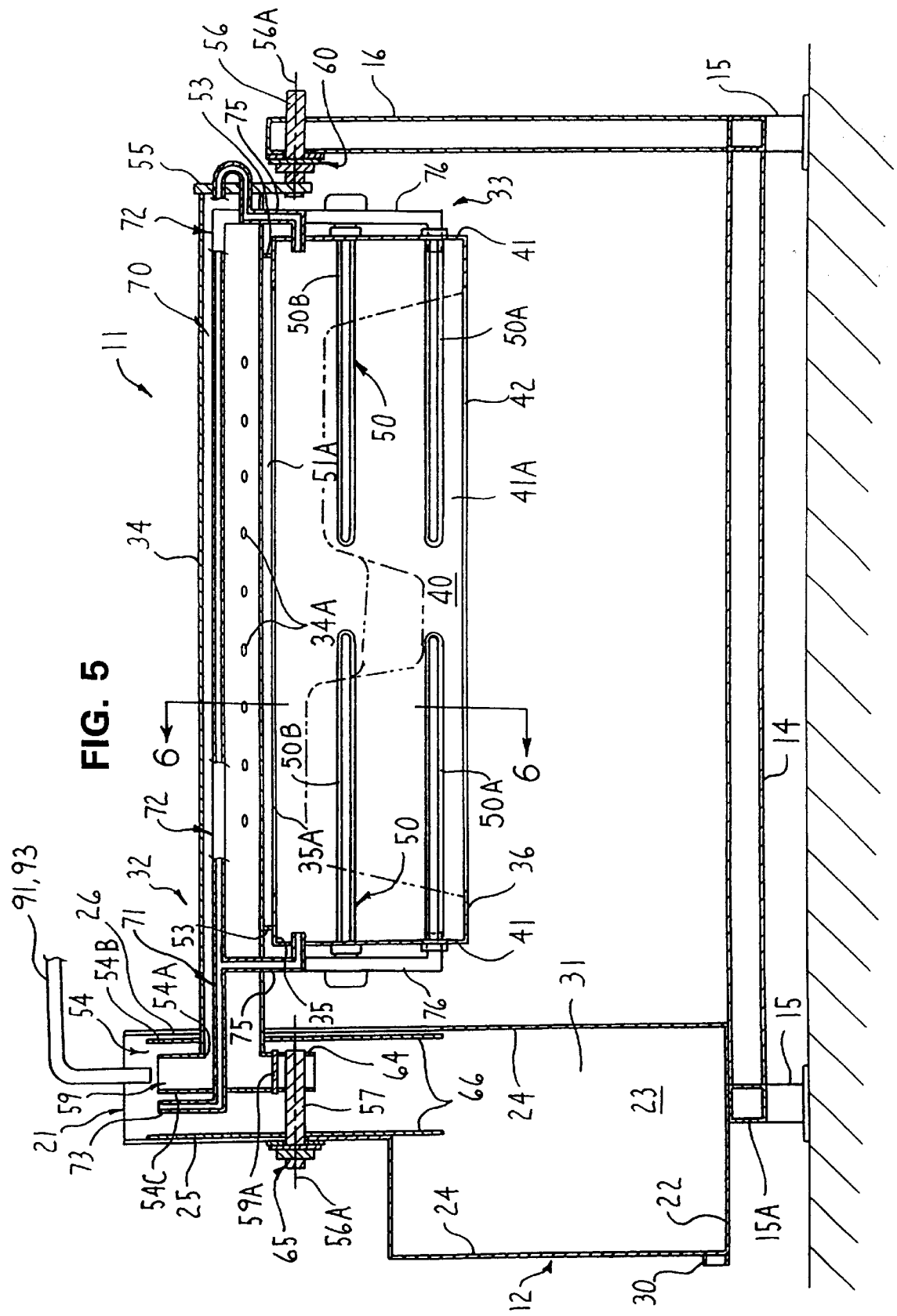

MOLDING PROCESS EMPLOYING HEATED FLUID

CROSS REFERENCE TO RELATED APPLICATION

This is a continuation-in-part of U.S. application Ser. No. 09/267,567, (Case 14) filed Mar. 12, 1999 now abandoned.

FIELD OF THE INVENTION

This invention relates to a molding apparatus and process employing a mold shell having a rear surface exposed to a heat source and a front surface heated to a temperature at which heat gelable thermoplastic material deposited on the front surface fuses into a thin, solid, thermoplastic molded product.

BACKGROUND OF THE INVENTION

Thermoplastic powders or slurries, known as dry or liquid plastisols, are conventionally cast on the inner surface of a thin metal shell or tool which is heated to the fusion temperature of the deposited material to form a gel coat which is heated sufficiently to form a thin, solid thermoplastic molded member (i.e. a skin). The thin metal mold shell remains heated until a thin layer of thermoplastic material is built up on the front or inner surface to form a thin plastic product, such as a product for use as an outer covering on automotive interior products such as door panels, instrument panels, or the like.

The apparatus and method for the production of molded skins are well known, such methods often being referred to as "rotational" or "slush" molding. The mold cavity defined by the mold tool is filled with a flowable plastic material and, due to heating of the mold shell, a thin layer of plastic material adheres to the surface of the mold tool and the remaining plastic material can then be shaken or poured out of the mold tool, as by rotating same. When the mold tool is further heated, the product clinging thereto gels out. The finished product can then be removed after'the mold tool cools. The operation of introducing the plastic material, when in the form of a powder or granule, is typically achieved by rotating the mold tool so that the mold cavity thereof opens downwardly, and then fixing onto the mold tool a box which contains the powdered plastic material. The mold tool and powder box are then rotated through about 180° so that the plastic material drops into the mold tool. After the plastic skin has set against the heated tool surface, the assembly is rotated back to its original position and the powder box and excess powder removed, with further heating of the mold tool effecting proper melting and gelling of all of the plastic material adhered to the tool surface. The mold tool is then cooled and the molded skin product removed.

In a typical rotational molding apparatus of the type described above, the mold assembly includes a generally hollow housing or box on which the metal mold tool is mounted, which housing and tool cooperate to define a hollow interior chamber to which heated air or fluid is supplied to effect heating of the mold tool from the rear surface thereof. More specifically, heated air or liquid is continuously supplied into one end of the mold housing and is discharged from the opposite end. This method of heating the mold tool, however, has long presented a problem since the irregularity in the shape of the mold tool and the length thereof have often made it difficult to provide the desired degree of heat uniformity as applied to the mold tool throughout the rear surface thereof. The mold tool thus often has undesired hot or cold spots which effect the quality (i.e. thickness and/or finished surface properties) of the molded skin product.

In an attempt to provide better control over the heat applied to the back surface of the mold tool, various flow arrangements have been proposed for controlling the flow of air through the mold housing. However, in these arrangements, temperature and velocity drops occur from one end of the mold housing to the other as the air moves therethrough, and this can result in unsatisfactory and uneven heating of the mold shell. In addition, the air flow control devices make the overall process more costly from a manufacturing standpoint.

In the arrangements which require pumping of heated liquid, such as oil, into one end of the mold housing and out of the opposite end thereof, temperature and velocity drops also occur as the heated liquid moves through the mold housing, causing nonuniform heating of the tool and resulting in a less than satisfactory product.

Further, in both types of rotational molding arrangements discussed above, pressure is utilized to fill the mold housing with fluid and suction is often utilized to discharge the fluid from the mold housing, and this typically requires the use of rotating pressure joints where the supply and discharge conduits connect to the mold housing. These types of joints significantly add to the expense and complexity of the arrangement and are therefore disadvantageous. In addition, the pressurized fluid stresses the mold tool and may shorten the useful life thereof.

Still further, in the known arrangements employing both heated air or heated oil for heating the tool, it is typical to provide the interior chamber of the mold housing with a matrix of flow tubes which are oriented transversely toward and terminate adjacent the rear surface of the tool so as to direct the heated air or oil toward the rear surface. The tubes defining this matrix are typically sized so that the discharge ends are all disposed close to but spaced generally a uniform distance from the rear surface of the tool. The discharge ends of the tube matrix thus define a profile which generally corresponds with the rear surface of the tool. This tool matrix is not only heavy and structurally complex, but is also configured to cooperate solely with a single tool shape, and hence is not adaptable to other tool shapes.

Also, the known molding arrangements employing hot oil for heating the tool typically require a pressurized supply system for the hot oil which not only increases the overall structural complexity of the system, but inherently decreases the overall safety of the system since even accidental minute leakage of pressurized hot oil can create a potential hazard to personnel working in the vicinity of the apparatus.

The present invention thus relates to an improved molding apparatus and method for forming a thin skin product which significantly improve upon the known apparatus and methods as briefly described above.

It is an object of the present invention to provide an improved molding apparatus and method for forming a thin skin product, which improved method and apparatus is believed to significantly improve the overall performance characteristics of the apparatus and method in terms of efficiency and rate of productivity. This invention provides more efficient heating of the rear surface of the mold tool by utilizing a mold arrangement capable of providing heated liquid in a more uniform manner to the rear surface of the mold shell, which results in more efficient and uniform heating thereof. In addition, the molding apparatus according to the invention is structurally simple and utilizes a batch of liquid within a mold tank to heat the rear surface of the mold tool, as compared to the above conventional methods which continuously flow heated fluid past or over the mold shell to heat same. Further, heating devices are provided within the mold tank and serve to maintain the liquid within the mold tank at a uniform temperature.

It is a further object of the present invention to provide an improved apparatus and method, as aforesaid, which due to the improved heating of the tool is capable of providing a more uniform and higher quality molded product in terms of uniform but thin thickness of the material defining the product, and which is capable of producing such product in a repetitive fashion as the method and apparatus are used in a typical production cycle.

A still further object of the invention is to provide an improved apparatus and method, as aforesaid, which in a preferred embodiment utilizes hot oil for heating the tool but employs a system whereby the hot oil is confined and moved about within an arrangement which is substantially nonpressurized so as to significantly improve the operational safety of the arrangement. This lack of a pressurized oil system is also believed to create less tool distortion during the molding cycle and thus improve tool life.

In the apparatus and method according to the present invention, particularly in a preferred embodiment, a generally hollow mold housing has an opening which mounts therein a mold tool so that a rear surface of the mold tool cooperates with the housing to define an interior chamber. A batch of preheated oil is supplied to this chamber to substantially cover the rear surface of the mold tool. A plurality of heaters, such as electric heater rods, are disposed in the interior chamber to supply makeup heat to the oil to maintain a uniform temperature thereof and effect uniform heating of the mold tool. The mold housing is preferably angularly oscillated through several cycles to effect agitation of the oil both to maintain uniformity of temperature thereof, and to cause the heated oil to move along the back surface of the mold tool to effect more efficient heating thereof. After heating of the tool a powder box is attached to the tool so as to permit powder to be supplied to and deposited on the front surface, whereupon the powder gels and melts to form a desired thin-walled product. After the powder box is detached, the hot oil is removed from the interior chamber, preferably by rotating the mold box into a partially inverted condition to permit gravity discharge of hot oil into a collecting tank. The mold box is returned to its upright position and cooling oil is then supplied into the interior chamber, and the mold box is preferably again cycled through several angular oscillations to agitate the oil in contact with the back surface of the mold tool to facilitate cooling of the tool and of the molded product attached thereto. The cooling oil is then removed, such as by partially inverting the mold to permit gravity discharge of cooling oil into an appropriate reservoir or holding tank. The product can then be removed from the mold tool, and the mold arrangement repositioned to initiate a new cycle by supplying heated oil to the interior chamber. The heated oil is preferably supplied to the interior chamber of the mold housing by a system which supplies the oil under a generally non-pressurized state to permit safe handling thereof, and the hot oil as supplied to the interior chamber is supplied substantially uniformly over the longitudinal length of the chamber to provide improved temperature uniformity throughout the entirety of the chamber.

Other advantageous structural features of the inventive apparatus, and advantageous operational features of the inventive method, are described in detailed hereinafter.

The advantageous apparatus and method of the present invention, and the objects and purposes thereof, will be apparent to persons familiar with molding of this general type upon reading the following description and inspecting the accompanying drawings.

BRIEF DESCRIPTION OF THE DRAWINGS

FIG. 2 is an enlarged cross-sectional view taken generally along line 2—2 in FIG. 1 and which also illustrates in dotted lines the mold tank in a position for removing the mold shell therefrom;

FIG. 3 is an enlarged cross-sectional view of the feed pipe taken generally along line 3—3 in FIG. 1;

FIG. 4 is an end view taken generally along line 4—4 in FIG. 1;

FIG. 5 is a cross-sectional view taken generally along line 5—5 in FIG. 2;

Figure 1:
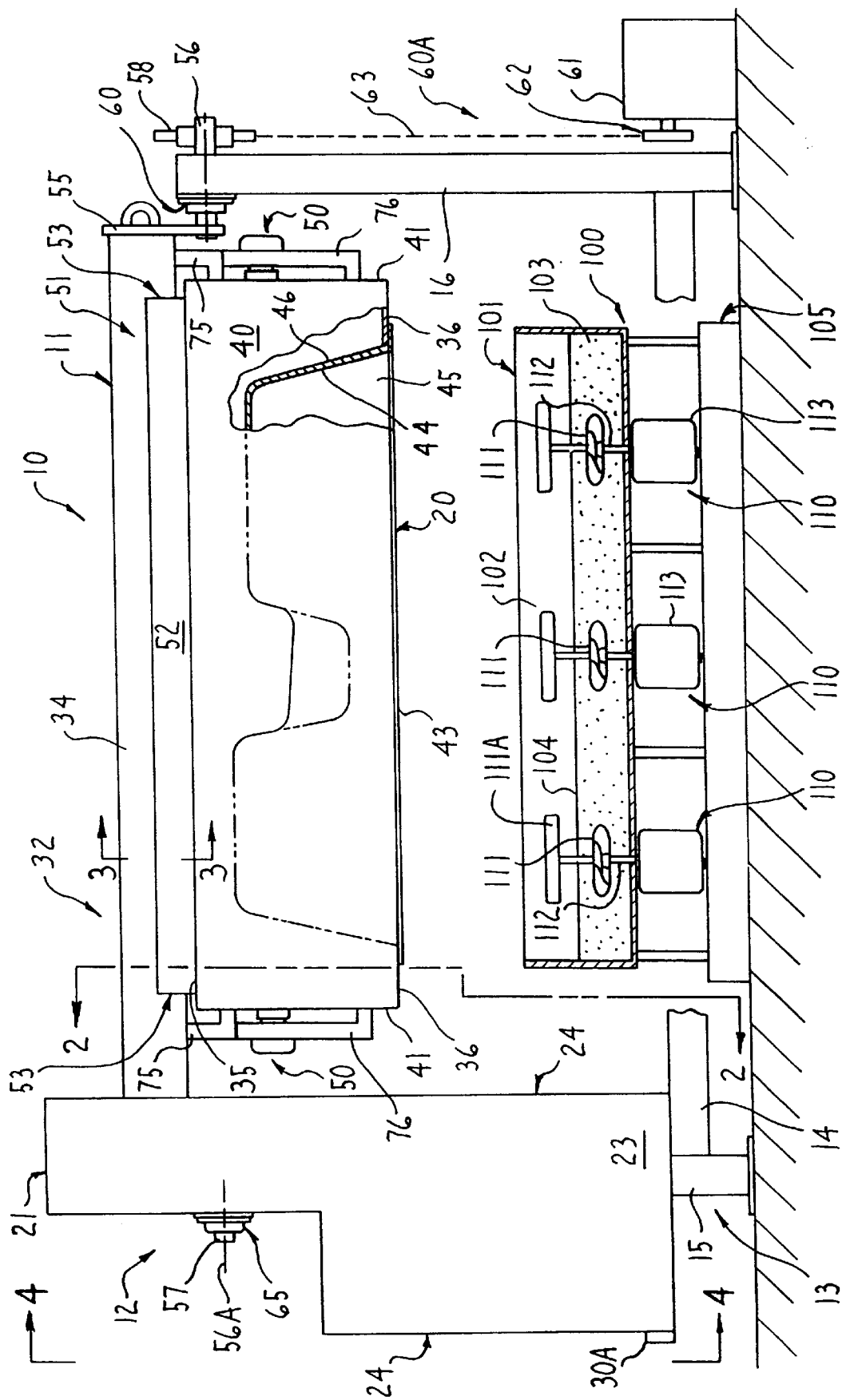
FIG. 1 is a side view of a molding system according to a first embodiment of the present invention.

Certain terminology will be used in the following description for convenience in reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION

Referring to the drawings, and specifically FIG. 1, there is illustrated a molding system 10 according to the present invention. The system 10 includes a mold arrangement 11, a hollow collection tank 12, and a frame 13. Frame 13 in the illustrated arrangement includes several generally horizontally disposed and elongate lower frame bars 14 (shown in broken section in FIG. 1) supported from a surface such as a floor by generally vertically oriented legs 15. Lower frame bars 14 are connected to one another at terminal ends thereof by additional lower frame bars 15A which extend transversely between frame bars 14 (FIG. 2). Collection tank 12 is supported by the lower frame bars 14, 15A and legs 15, and is located at one end of the mold arrangement 11 in FIG. 1. Frame 13 also includes an upright end frame 16 disposed at the opposite end of the mold arrangement 11 from collection tank 12, and mold arrangement 11 is supported between and rotatably carried by the collection tank 12 and end frame 16. Further, mold arrangement 11 is preferably configured to mount on one side thereof a large, thin metal mold shell or tool 20.

As illustrated in FIG. 5, collection tank 12 has an open upper end 21, a bottom wall 22, two side walls 23 which extend upwardly from bottom wall 22, and two end walls 24 which extend transversely between and interconnect the bottom and side walls 22 and 23. Outermost end wall 24 defines an upwardly opening, elongate slot 25 (FIG. 4) therein having a rounded lower end, and innermost end wall 24 defines an upwardly opening window 26 therein (shown in dotted lines in FIG. 4) opposite slot 25.

Collection tank 12 additionally includes a pair of discharge outlets 30 and 30A (FIG. 4) located along the lower portion of outermost end wall 24 which communicate with the hollow interior 31 of collection tank 12.

Turning now to mold arrangement 11, and with reference to FIG. 5, same includes a fluid supply system 32 which supplies fluid to a hollow mold housing or tank 33 via an elongate feed pipe 34. Mold tank 33 has generally parallel top and bottom wall sections 35 and 36, a pair of generally parallel side wall sections 40 extending transversely between the top and bottom wall sections 35 and 36, and a pair of spaced-apart and generally parallel end wall sections 41 which extend transversely between and interconnect the top, bottom and side wall sections 35, 36 and 40. Top, bottom, side and end wall sections 35, 36, 40 and 41 together define a hollow interior or chamber 41A of mold tank 33. The overall shape of the mold tank 33 is, in the illustrated embodiment, generally rectangular. It will be appreciated that mold tank 33 may be insulated, and in this regard top, bottom, side and end wall sections 35, 36, 40 and 41 may be embodied by a double-wall construction (not shown) with an insulating layer therebetween.

The top wall section 35 has an elongate opening 35A (FIG. 2) therein which provides access to the interior 41A of mold tank 33. Further, bottom wall section 36 preferably defines therein a generally rectangular opening 42 in which the mold tool 20 (not shown in FIG. 5 for purposes of simplicity) is stationarily disposed as discussed below.

The mold tool 20 (FIG. 1), which is typically constructed of metal, is stationarily mounted on the mold tank 33 by being disposed within opening 42. The mold tool 20 typically has a surrounding edge flange 43 which enables same to be stationarily and fixedly seated on the mold tank 33 so that mold tool 20 is positioned within the opening 42 and projects into the interior 41A of the mold tank 33. The flange 43 may be fixed to the mold tank 33 by clips or other suitable fasteners (not shown). The mold tool 20 typically has a significant three-dimensional shape which provides a generally irregular contour throughout, which shape corresponds to the desired shape of the skin or shell product being molded.

The mold tool 20 has an outer or front molding face 44 which defines therein a mold cavity 45 which opens inwardly from the outer side of the mold tank 33. The mold tool 20 is typically rather thin and of approximately uniform thickness, and has an inner or rear face 46 which has a configuration similar to the front molding face 44. This rear face 46 is positioned inside the mold tank 33 so as to partially define an interior surface thereof.

Figure 6:
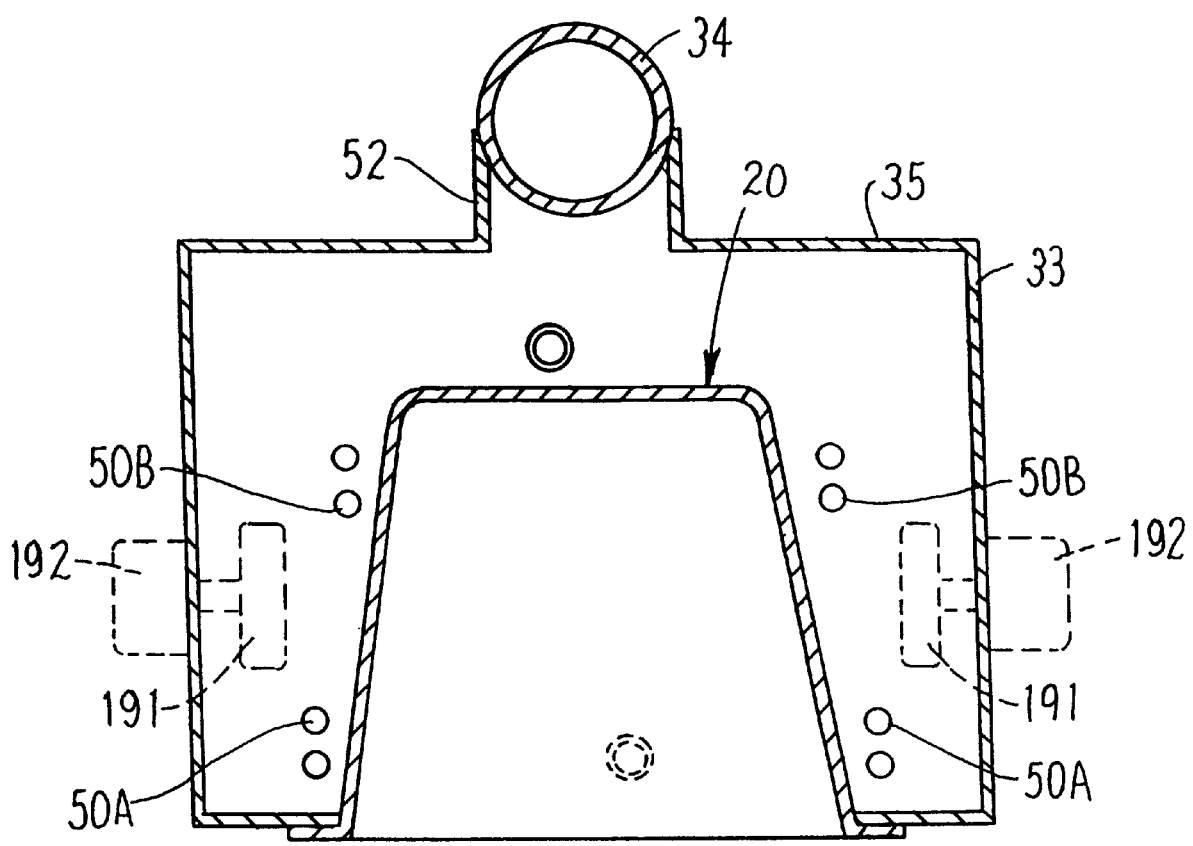
FIG. 6 is a cross sectional view taken generally along line 6—6 in FIG. 5.

As shown in FIGS. 5 and 6, a plurality (here eight) of electric heating devices 50 are mounted on the mold tank 33. More specifically, four heating devices 50 are mounted in a spaced-apart manner to each end wall section 41. so as to extend therethrough and into the interior 41A of mold tank 33. One type of heating device 50 which may be utilized is a commercially available Calrod electric heater, which includes a temperature probe which reads the temperature of the fluid within mold tank 33 and operates to activate and deactivate the heating device 50. The heating devices 50 are preferably individually controllable, and are preferably connected to and controlled by a central control unit or panel (not shown).

The heating devices 50 are preferably elongated so as to extend longitudinally throughout the length of the interior of the mold housing at several transversely spaced locations which are positioned generally around but closely adjacent the back wall of the mold tool 20. In the illustrated embodiment the longitudinal length of the heating elements 50 is achieved by positioning a cooperating pair of heating elements in generally longitudinally aligned relationship so that they project inwardly toward one another from opposite ends of the mold housing 33, with the heating elements being cantilevered outwardly slightly less than one half of the overall longitudinal length so that the free ends of the opposed pair of heating devices are disposed in closely adjacent and opposed relationship from one another. As an alternate construction, however, the pair of aligned and opposed cantilevered heating devices can be replaced by a single heating device which extends longitudinally between and connects to the opposed end walls of the mold housing 33.

Further, the interior chamber of the mold housing 33 is preferably provided with at least two heating devices which extend longitudinally thereof and are disposed on opposite sides of and closely adjacent the mold tool substantially at the bottom of the interior chamber, that is, closely adjacent the mouth or opening of the mold housing in which the mold tool is seated. This is illustrated by the heating devices designated as 50A in FIGS. 5 and 6.

A further pair of heating devices, such as the devices 50B in FIGS. 5–6, are also preferably disposed within the interior chamber and are positioned closely adjacent and on opposite sides of the mold tool in generally upwardly spaced relation from the lower heating devices 50A. These upper heating devices 50B are disposed so as to be totally immersed in the heat transfer oil when the latter is supplied to the mold housing, and these heating devices 50B are thus disposed downwardly a substantial distance from the top wall 35 of the mold housing 33. All of the heating devices such as 50A and 50B can be appropriately contoured, if desired, so as to follow or generally conform to the contour of the mold tool if desired.

The feed pipe 34 is fixedly attached to mold tank 33 adjacent the top wall 35 thereof by an elongate mounting flange 51. Mounting flange 51 includes a pair of generally parallel side wall members 52 (FIGS. 2 and 3) which are fixedly attached (for example by welding) along lower longitudinal edges thereof to the top wall section 35 of mold tank 33 adjacent the longitudinal edges of wall section 35 which define opening 35A therebetween. The upper longitudinal edges of side wall members 52 are fixedly attached to opposite sides of the outer surface of feed pipe 34. Mounting flange 51 also has a pair of spaced-apart and generally parallel end wall members 53 (FIG. 5) which extend transversely between and interconnect side wall members 52. End wall members 53 each include an upper edge having a generally concave configuration which conforms to the shape of the outer surface of feed pipe 34 fixedly attached thereto. The lower edges of end wall members 53 are fixedly attached to the top wall section 35 of mold tank 33 adjacent the transverse edges of wall section 35 which define opposite ends of the opening 35A.

Feed pipe 34 extends through window 26 of the innermost end wall 24 of collection tank 12 and is attached at one of its terminal ends to an upright feed tube 54 (FIGS. 4 and 5) located within the interior 31 of collection tank 12 at an upper portion thereof. The interior of feed pipe 34 communicates with the interior of feed tube 54 via an opening 54A within an inner side wall 54B thereof. Feed tube 54 has an open upper end 59 and is closed at the lower end thereof by a bottom wall or end plate 59A.

The feed pipe 34 is closed at the opposite terminal end thereof by a vertically oriented and generally flat end plate 55. As best shown in FIGS. 3 and 5, feed pipe 34 includes a plurality of openings 34A therein arranged in a plurality of longitudinal rows (herein four) along a lower or downwardly facing portion of feed pipe 34. Openings 34A are enclosed by mounting flange 51, which mounting flange 51 defines an elongate channel or passage 51A (FIGS. 2 and 5) which enables communication between the interior of the feed pipe 34 (via openings 34A) and the upper opening 35A in mold tank 33 over substantially the entire length thereof.

The mold arrangement 11 may additionally be provided with an elongate and insulated cover (not shown) which extends along and encloses feed pipe 34 to provide more efficient heat retention.

End plate 55 and feed tube 54 non-rotatably mount thereon coaxially aligned shafts 56 and 57, respectively, which define an axis of rotation 56A for mold tank 33. Shaft 56 is rotatably supported at one end thereof by a bearing 60 mounted on end frame 16, and at the other end thereof mounts thereon a sprocket wheel 58 (FIG. 1). A drive arrangement 60A is provided adjacent end frame 16, which drive arrangement 60A includes a conventional electric motor 61 and effects driving of a sprocket wheel 62 associated therewith and sprocket wheel 58 which are joined together by a drive chain 63 (shown in dotted lines). The drive arrangement 60A may be controlled by the operator via a conventional control panel (not shown). It will be appreciated that rotatably driving the mold arrangement 11 is conventional, and numerous conventional drive arrangements can be provided for such purpose.

With reference to FIGS. 4 and 5, one end of shaft 57 is mounted on a support member 64 which defines the lowermost end of feed tube 54. The opposite end of shaft 57 extends through slot 25 of collection tank 12 and is rotatably supported thereon by a bearing 65 mounted on an outwardly facing wall of collection tank 12.

The mold arrangement 11 has a pair of generally circular, plate-like and spaced-apart splash guards 66 (FIGS. 2 and 5). The outermost splash guard 66 is fixedly attached to shaft 57 so as to surround same, and the innermost splash guard 66 is fixedly attached to the outer surface of feed pipe 34 in a surrounding manner. The splash guards 66 are disposed between but adjacent opposite end walls 24 of collection tank 12 and preferably serve to minimize splashing of fluid during operation of the mold system 10, for example when fluid is discharged from the mold tank 33 into the collection tank 12 as discussed below.

The mold arrangement 11 also includes an air venting system 70 (FIG. 5) embodied by elongate vent tubes 71 and 72 each having portions which extend within the interior of the feed pipe 34 and the collection tank 12. The vent tubes 71 and 72 respectively include upwardly bent, open-ended tube sections 73, 74 (FIG. 4) located within an upper interior portion of collection tank 12 adjacent feed tube 54. Tube sections 73, 74 at the free ends thereof preferably communicate with the atmosphere. The vent tubes 71 and 72, in the illustrated embodiment, are arranged in a side-by-side manner relative to one another and have portions which extend within the interior of feed pipe 34. Vent tubes 71 and 72 respectively include a pair of downwardly bent tube sections 75 and 76, respectively, which extend outside of feed pipe 34 and generally along the respective right and left end walls 41 of mold tank 33. The tube sections 75 of vent tube 71 extend into and communicate with interior 41A of mold tank 33 adjacent an upper portion thereof, and tube sections 76 of vent tube 72 extend into and communicate with interior 41A adjacent a lower portion thereof for a purpose discussed below.

It will be appreciated that the air venting system 70 may alternatively be provided totally exteriorly of the molding arrangement 11, i.e. the mold tank 33 may simply be provided with separate upper and lower vent tubes which allow the interior 41A of mold tank 33 to communicate with the atmosphere.

As shown schematically in FIG. 4, hot heat transfer liquid, and preferably hot oil, is fed into the open upper end 59 of feed tube 54 from a hot liquid tank 90 via a supply line 91 having a valve 98 (shown schematically) at one end thereof. Similarly, cold liquid is fed into the open upper end 59 of feed tube 54 from a cold liquid tank 92 via a supply line 93 having a valve 97 associated therewith. Hot and cold liquid tanks 90 and 92 are separate from one another and respectively communicate with discharge outlets 30 and 30A of collection tank 12 via discharge lines 93A and 94. Further, hot and cold liquid tanks 90 and 92 are, in accordance with one embodiment, located above collection tank 12 and feed tube 54 such that fluid can be fed into feed tube 54 via gravitational forces. In this regard, each discharge line 93A and 94 may have a pump 95, 96 associated therewith to assist in transporting fluid from collection tank 12 back to the respective hot and cold liquid tanks 90 and 92. Valves 97 and 98 associated with supply lines 93 and 91 may be manually or remotely electrically actuated. If necessary or desired, the tanks 90 and/or 92 can be at lower elevations and provided with pumps to supply fluid to and through the lines 91 and 93.

Referring back to FIG. 1, the mold arrangement 11 also includes a particulate material supply box 100, commonly known as a powder box, for use in association with mold shell 20. The powder box 100 is typically of a box-like configuration having a top opening 101, and defining therein an interior chamber 102 which contains a significant quantity of particulate material, such as powdered or granular thermoplastic. The granular or powdered thermoplastic, as indicated at 103, typically fills only a part of the chamber 102, and such is depicted by the upper level of the quantity of plastic as indicated at 104.

The powder box 100 may be mounted on a suitable conventional lifting device as indicated diagrammatically at 105, which device enables the powder box 100 to be lifted upwardly into engagement with the bottom of the mold tank 33 so that the powder box 100 effectively surrounds and closes the outer periphery of the mold shell 20. The interior of the powder box 100 and the mold cavity 45 thus cooperate to effectively define a closed chamber when the powder box 100 is in a position of engagement with the mold tank 33.

The powder box 100 in this embodiment has an agitating arrangement associated therewith for effecting agitation of the plastic particles within the powder box 100, particularly when the latter is attached to the mold tank 33. This agitating arrangement includes at least one and preferably a plurality of agitating devices 110 which are associated with the interior of the powder box 100 to effect rapid agitation of the plastic particles so as to cause the particles to become airborne and to be effectively propelled upwardly from the box 100 into the mold cavity 45 for contact with the heated front molding face 44 of mold tool 20.

Each agitating device 110, in the illustrated embodiment, includes an agitating member 111 such as a bladed wheel, the radially projecting blades of which preferably are twisted to create an axial flow component when the bladed wheel 111 is rotated. The bladed wheel 111 is positioned interiorly of the chamber 102 below the typical static level 104 of the solid plastic particles, and is secured to a rotatable drive shaft 112 which projects downwardly through the bottom of powder box 100 and is associated with a suitable drive motor 113 such as an electric motor. When the drive motors 113 are energized, the rotation of the bladed wheel 111 causes the plastic particles to be highly agitated so that they effectively become airborne and are propelled upwardly toward the front molding surface 44, with the particles being propelled and moved about the entirety of the enclosed mold cavity 45. In the illustrated arrangement the agitating device 110 also includes a second agitating member 111A, also preferably formed as a bladed wheel, the latter being secured to an upward extension of the drive shaft 112 so as to be normally spaced upwardly from the agitating member 111 and thus disposed above the typical static level 104 defined by the bed of plastic particles. With the double agitator wheel arrangement, rotation of the lower wheel 111 causes creation of an upward cloud of particles which move upwardly into the vicinity of the upper wheel 111A, the latter due to its rotation causing a significant and greater dispersion of the particles so that they are propelled and moved about the enclosed mold cavity so as to move into contact with the front surface of the mold tool 20.

The number of agitating devices 110 utilized will of course be a function of the size of the powder box 100, the size and density of the plastic particles being used, the shape of the molding surface 44, the size and shape and configuration of the bladed wheels 111, and other factors which can obviously influence the overall operation. It is normally preferred, however, that several agitating devices be distributed throughout the powder box 100 so as to increase the effectiveness of the agitation of the particles.

To further increase the effectiveness of the agitation and the uniformity thereof throughout the entire mold cavity 45, it is contemplated that the individual agitating devices 110 will be mounted so that the drive shafts 112 thereof will vertically pivot or gyrate to hence cause transverse displacement of the rotating bladed wheel 111 and thus more effective agitation and dispersement of the plastic particles.

The operation of the molding system 10 according to the embodiment of FIGS. 1–6 will now be briefly described.

In operation, the mold tank 33 will initially be in the downwardly facing position as illustrated in FIG. 1. The mold tool 20 is mounted and maintained stationary on the mold tank 33 so that the front molding face 44 faces downwardly, and a powder box 100 containing therein a desired quantity of plastic particles will be provided for association with the molding arrangement 11, the powder box 100 typically being maintained in an open position (i.e., spaced from the mold tool).

The mold cycle is initiated by supplying liquid and preferably oil heated to a predetermined temperature, and preferably at least the fuse temperature of the particular plastic particles being utilized, into the feed tube 54 from the hot liquid supply 90 by opening the valve 98 of supply line 91 (FIG. 4). The heated liquid then enters the feed pipe 34 and is discharged into the mold tank 33 via the feed pipe openings 34A and opening 35A of mold tank 33, and ultimately into the mold tank chamber 41A. This arrangement ensures that the heated oil is supplied into the interior of the mold housing through the upper extremity of the mold housing throughout substantially the entire longitudinal length thereof, thereby ensuring that uniform oil temperature exists in the oil supplied throughout the entirety of the chamber, and thus minimizing any temperature differential lengthwise of the housing. Heated liquid of sufficient quantity is supplied to the mold tank 33 until the rear surface 46 of mold tool 20 is covered with liquid. During filling of mold tank 33, the tube sections 75 of vent tube 71 allows escape of air within mold tank 33 which is displaced by the liquid. Valve 98 is then closed. Heating devices 50 within mold tank 33 are activated to maintain the liquid temperature at the predetermined operating or fuse temperature.

To maintain the mold tool 20 at a uniform operating temperature, the drive motor 61 is energized so that the mold tank 33 (which is normally only partially filled with liquid) is oscillated by partially rotating or swinging same back-and-forth through a small angle about axis 56A for a short period of time which causes sloshing of the heated liquid therewithin and serves to mix and uniformly distribute the heated liquid so as to uniformly heat the rear surface 46 of mold tool 20. The sloshing movement also causes the heated oil to move rapidly cross the rear surface of the mold tool 20 to thus increase the transfer of heat thereto. During this time the heating devices 50 are also selectively energized, depending upon the temperature sensed by the respective thermocouple, so as to supply additional makeup heat to the liquid to thus maintain the liquid substantially at the desired temperature. The powder box 100 is then lifted upwardly for attachment to the mold tank 33 and cooperates with the mold tool 20 to close off the mold cavity 45. Thereafter, the agitating devices 110 are energized to cause agitation of the plastic particles in the powder box 100, which particles become airborne and are propelled upwardly toward the mold tool 20, with the agitated and thus airborne particles being effectively distributed throughout the entire mold cavity 45. As the agitation is maintained, the particles contact the heated front mold face 44 of the mold tool 20 and tend to become sticky and adhere thereto, whereupon conductive heat is transmitted to the particles and they effectively gel and create a thin layer which coats over the front mold face 44. As the agitation of the plastic particles continues, additional particles contact and adhere to the gel layer, which continues to be heated through the mold tool 20 and effects more complete melting of the adhered layer, so that additional particles thus buildup the thickness of the adhered layer a small layer at a time, with the additional particles progressively themselves melting and hence becoming an integral part of the molded article. During the agitation cycle, the excess particles tend to resettle in the powder box 100, and hence do not collect in the mold cavity 45. The agitation of the plastic particles is continued for a predetermined time until an article of desired thickness has been formed by being molded against the front mold face 44 of the mold tool 20. During the article forming process, the heaters 51 continue to maintain the desired temperature of the heating liquid within the mold housing so as to maintain a desired tool temperature.

If necessary or desired, the mold housing with the powder box attached can also be angularly oscillated so as to effect sloshing of the heated oil within the mold housing during the forming of the molded product. However, oscillating of the mold housing with the powder box attached may not normally be required.

When the desired article thickness has been achieved, then the agitating devices 110 are deenergized or stopped, thereby allowing the plastic particles to resettle in the powder box 100, and then same is detached and moved downwardly away from the mold tool 20. With the powder box 100 detached, heating devices 50 are deactivated, and the mold tank 33 is rotated upwardly approximately 180° so that substantially all of the liquid within mold tank 33 is discharged via gravity therefrom via openings 34A in feed pipe 34, through feed pipe 34, and out the now inverted open end 59 of feed tube 54 and into collection tank 12. The discharged heated liquid is then returned to hot liquid tank 90 via line 93A and pump 95 for reheating and reuse. During discharge of the liquid from mold tank 33, the tube sections 76A of vent tube 72 assist in the gravity flow of the liquid by permitting air to reenter the mold tank 33 above the liquid therein.

The mold tank 33 is then rotatably returned into its downwardly facing position in preparation for the cooling phase of the mold cycle. The chamber 41A of mold tank 33 is now partially filled with a quantity of cooling liquid from cold liquid supply tank 92 via feed tube 54 by opening valve 97 of supply line 93. While the quantity of cooling liquid supplied to the mold housing may be substantially the same as the quantity of heating liquid so as to effect total immersion or covering of the rear tool surface, nevertheless it is preferred to provide a lesser quantity of cooling liquid so that the latter is a small fraction (for example ¼) of the quantity of heating liquid typically utilized. Thus, when this smaller quantity of cooling liquid is supplied to the mold chamber, the rear surface of the tool is only partially immersed or covered with the cooling liquid. The mold housing 33 is then angularly oscillated back and forth about its axis so as to cause back and forth sloshing of the cooling liquid across the entirety of the back surface of the tool to thus cause rapid and generally rather uniform cooling of both the tool 20 and of the molded article attached thereof. After the mold tool 20 is cooled down a sufficient amount, the mold tank 33 is again rotated upwardly approximately 180° to effect gravity discharge of the cooling liquid therewithin into collection tank 12 in the same manner described above relative to the hot liquid. The liquid in tank 12 is then returned to the cold liquid tank 92 via discharge line 94 and pump 96.

After discharge of the cooling liquid within mold tank 33, the mold tank 33 is thereafter rotated approximately 90° from the upward position (as shown in dotted lines in FIG. 2), and the molded article may then be removed from the mold tool 20 to permit a subsequent molding cycle to be initiated.

Figure 7:
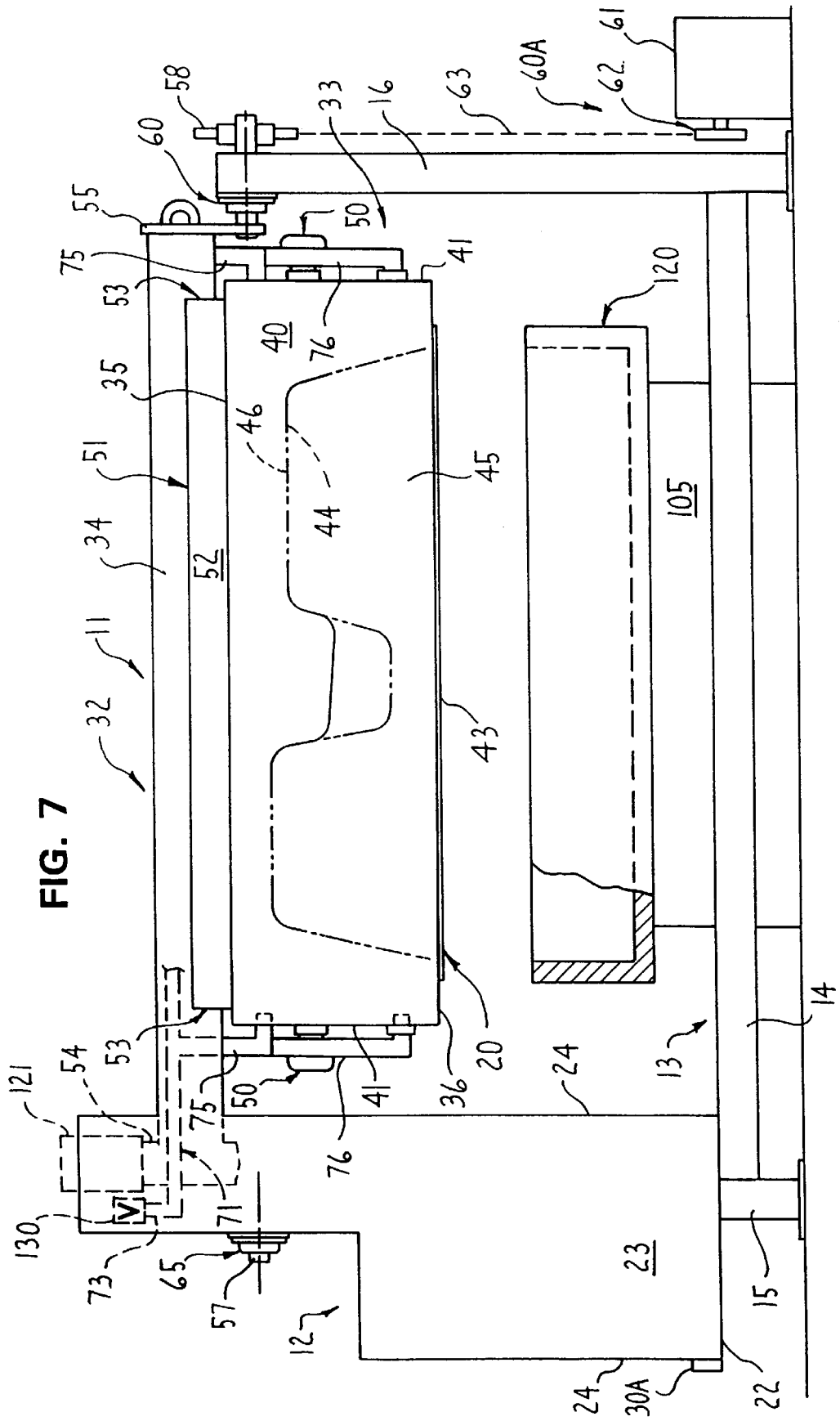
FIG. 7 is a side view similar to FIG. 1 but showing a second embodiment of the molding system.

A second embodiment according to the present invention is illustrated in FIG. 7. Since the embodiment illustrated in FIG. 7 is similar to the above-discussed embodiment of FIGS. 1–6, the same reference numbers are utilized to depict the same or similar components.

FIG. 7 illustrates the molding arrangement 11 in use with EL conventional powder or mold box 120 containing particulate plastic material which is lifted upwardly by a lift device 105 for attachment to mold tank 33 so as to enclose the mold cavity 45. Further, the molding arrangement 11 is provided with a closure valve 121 (shown schematically and in dotted lines in FIG. 7), which valve 121 is stationarily mounted atop feed tube 54 and operates to open and close the upper end 59 thereof. Valve 121 may be manually or remotely electrically actuated.

In addition, in this embodiment, the open upper ends of upright tube sections 73 and 74 of vent tubes 71 and 72 are each provided with a closure valve 130 (only one of which is shown schematically and in dotted lines in FIG. 7 in association with tube section 73). Valves 130 may be manually or remotely electrically actuated to open and close the respective vent tubes 71 and 72.

The operation of the embodiment of FIG. 7 is essentially the same as the operation of the first embodiment, except that when feeding liquid into mold tank 33, valve 121 must be opened prior to or simultaneously with the opening of valves 97 or 98. At least valve 130 of vent tube 71 must also be opened during filling of mold tank 33. Also, the interior chamber of the mold housing 33 as defined adjacent the back surface of the mold tool should be filled with heated oil at least sufficient to cover the back surface of the mold tool 20. In addition, after the mold tool 20 is brought up to the operating temperature and the powder box 120 is lifted and attached to mold tank 33 as discussed above, valve 121 is closed to prevent discharge of heated liquid from feed tube 54, valves 130 are closed to prevent discharge of heated liquid from vent tubes 71 and 72, and thereafter the mold tank 33 is rotated upwardly approximately 180° so that the powder box 120 is disposed uppermost. This enables the plastic material within the powder box 120 to fall downwardly into the mold cavity 45 and contact the front mold face 44 of the preheated mold shell 20, thereby causing some of the plastic particles to immediately melt and create a thin skin which adheres to the front mold face 44. This uppermost position of powder box 120 is maintained for a relatively short period of time, and the mold tank 33 is then rotated downwardly approximately 180° once again, which ensures that the heated liquid again entirely covers rear surface 46 of mold tool 20 and continues heating the plastic particles.

It may be desirable to rotate the mold tank 33 upwardly more than one time in order to agitate and thus distribute the plastic particles within the mold cavity. In this regard, it may be desirable to rotate the mold tank 33 upwardly through an angle of approximately 270° several times subsequent to or in place of the initial 180° upward rotation which serves to dump the plastic particles into the mold cavity 45.

The powder box 120 is removed with the mold tank 33 in the downwardly oriented position. Heating of the mold tool 20 is continued for a predetermined time until the article of desired thickness has been formed by being molded against the front mold face 44 of the mold tool 20. The valve 121 associated with feed tube 54 and at least valve 130 of vent tube 72 are then opened, and the mold tank 33 rotated upwardly approximately 180° so that substantially all of the liquid within mold tank 33 is discharged by gravity into collection tank 12 and returned to the hot liquid tank 90 as discussed above.

The mold tank 33 is rotated approximately 180° into the downwardly facing position once again, and valve 97 is opened so as to permit communication between supply line 93 and feed tube 54, and the mold tank 33 is partially filled with a quantity of cold liquid (with valve 130 of vent tube 71 open) to cool mold tool 20 and the molded article. Thereafter, valve 97 is closed and the mold tank 33 is oscillated back-and-forth to slosh the liquid and effect cooling of the mold shell, and then the mold tank is again rotated upwardly approximately 180° to discharge the cold liquid therewithin into collection tank 12 (with valve 121 and valve 130 of vent tube 72 open) for return to cold liquid tank 92. The mold tank 33 is then rotated approximately 90° and the article removed from the tool.

Figure 8:
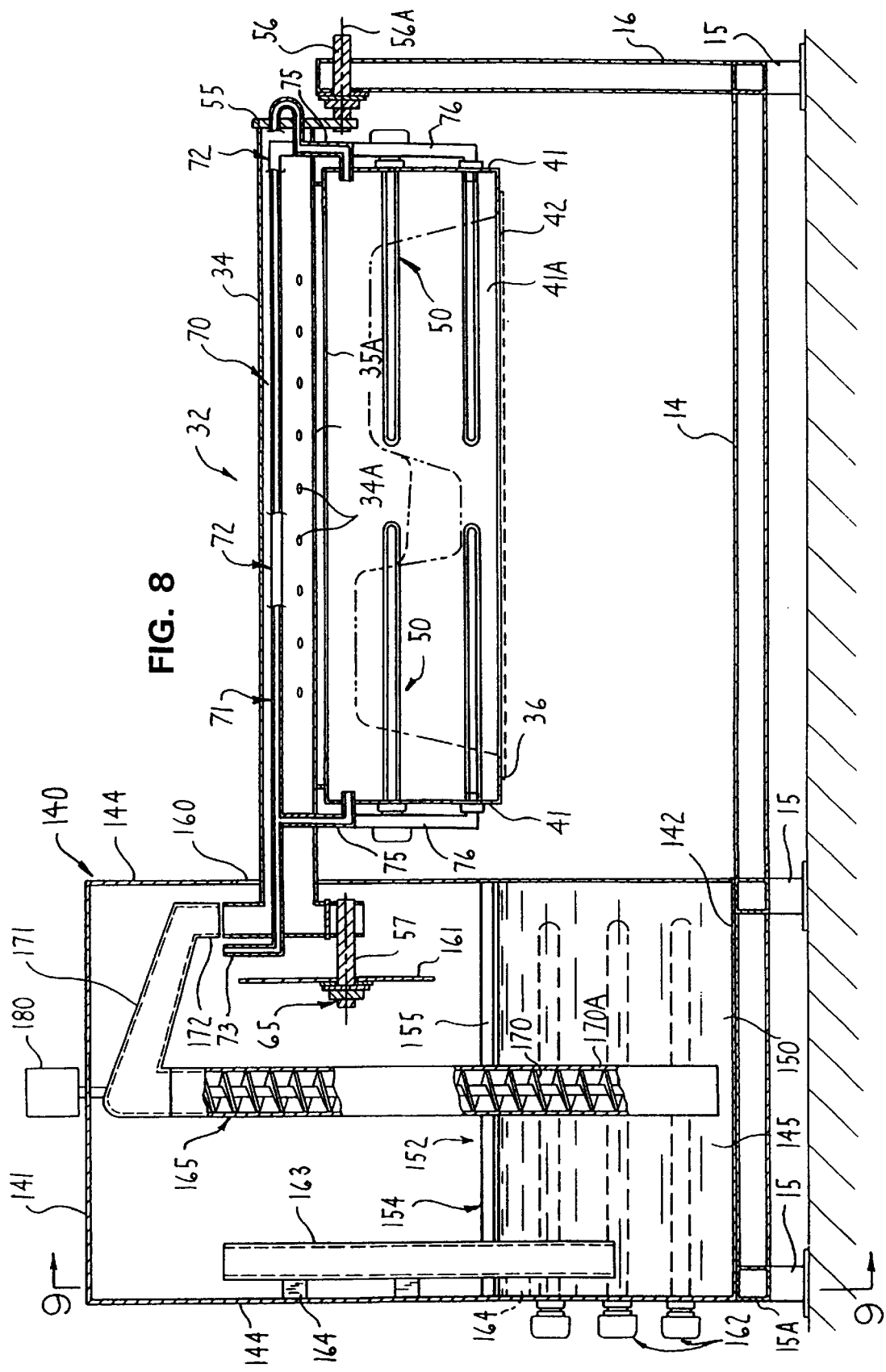
FIG. 8 is a cross-sectional view similar to FIG. 5 but showing a third embodiment of the invention.
Figure 9:
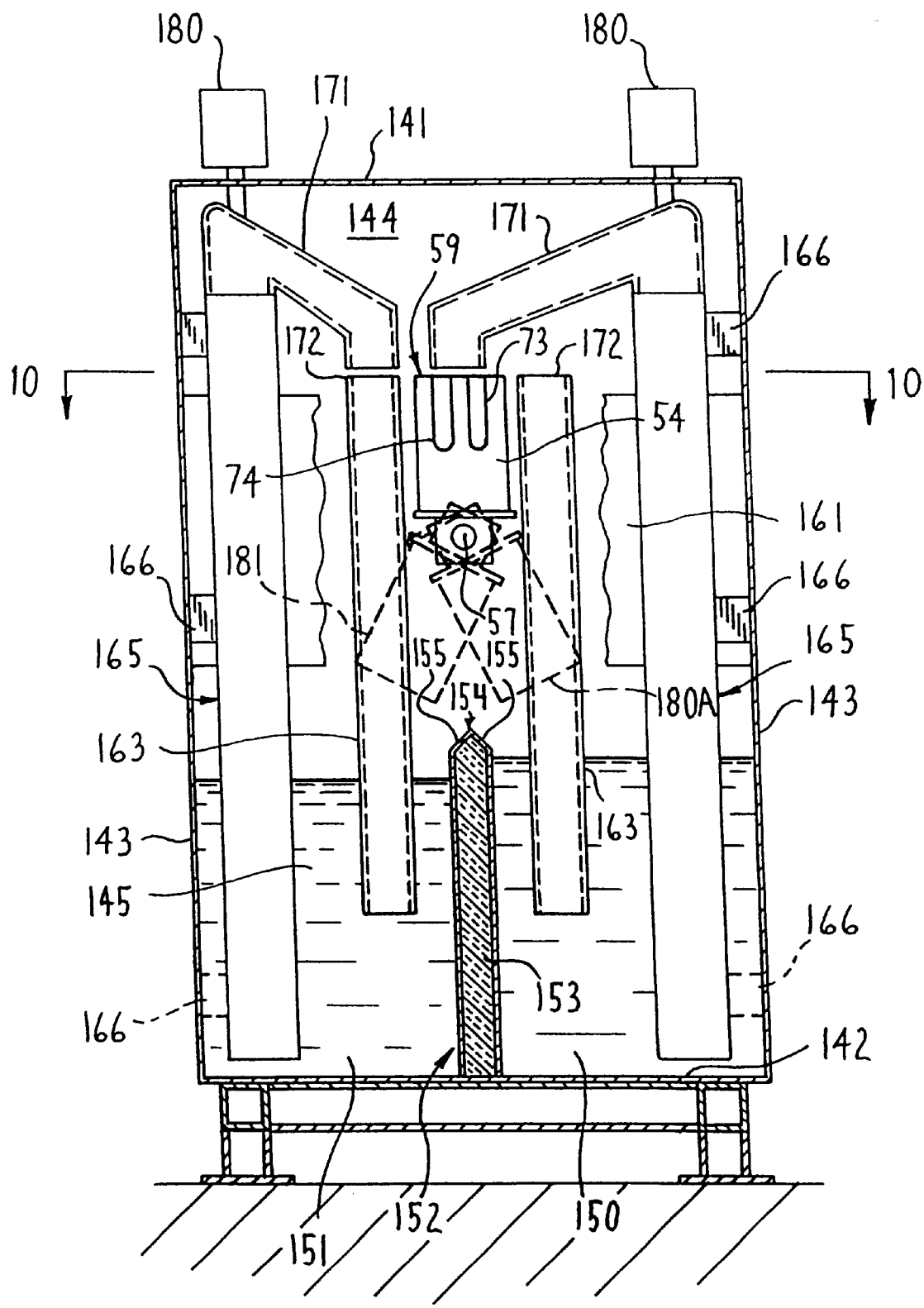
FIG. 9 is a cross-sectional view taken generally along line 9—9 in FIG. 8.
Figure 10:
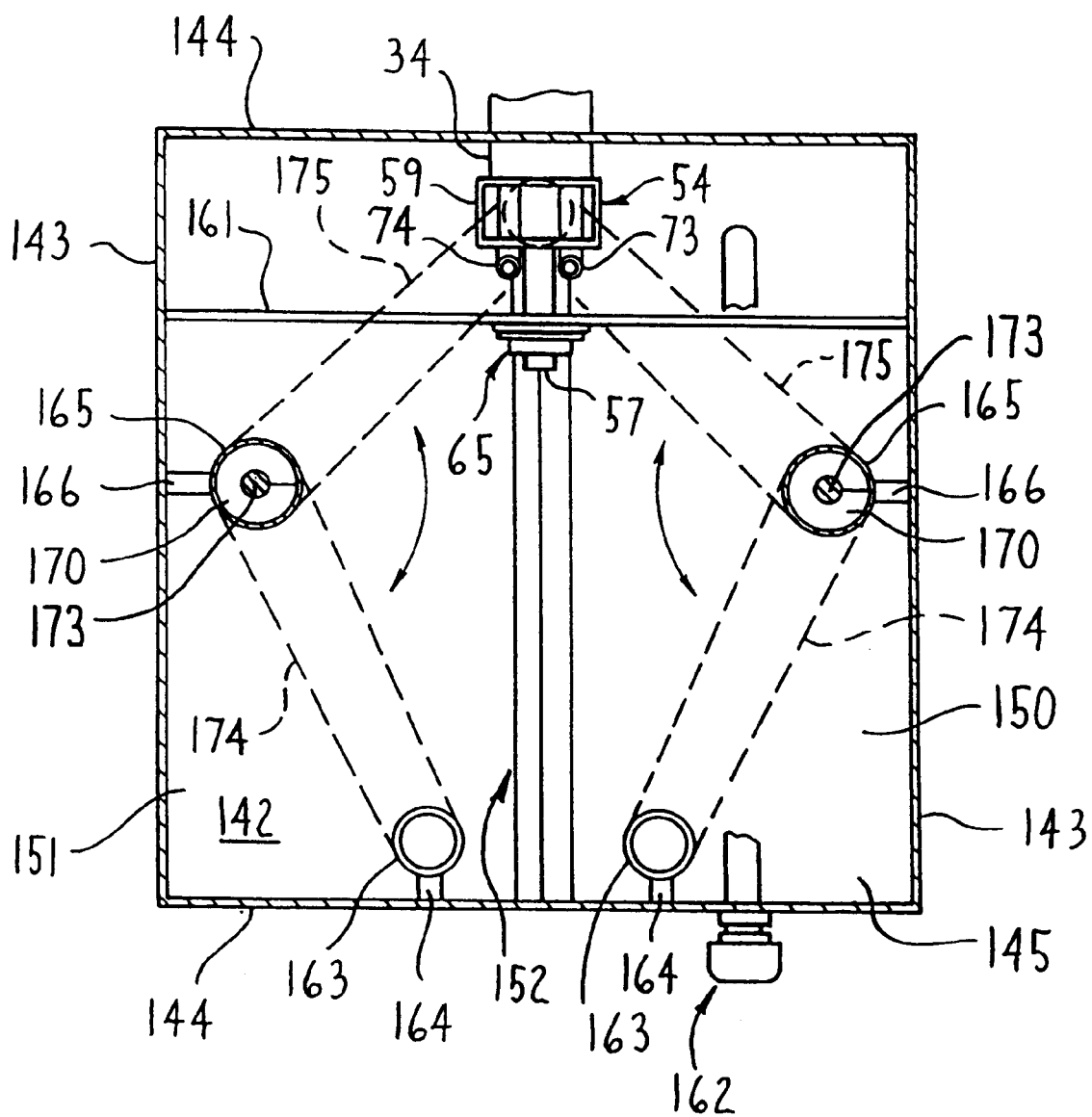
FIG. 10 is a cross-sectional view taken generally along line 10—10 in FIG. 9.

A third embodiment according to the present invention is illustrated in FIGS. 8–10. The embodiment of FIGS. 8–10 is similar to the prior embodiments and therefore the same reference numbers are utilized to depict the same or similar parts. The primary difference between the third embodiment and the previous embodiments is that a hot and cold liquid holding or supply tank 140 is provided in place of collection tank 12. Supply tank 140 includes top and bottom walls 141 and 142, a pair of upright side walls 143 which extend transversely between top and bottom walls 141 and 142, and a pair of upright end walls 144 which extend transversely between and interconnect the top, bottom and side walls 141, 142 and 143. Top, bottom, side and end walls of supply tank 140 together define a substantially enclosed, hollow interior 145 thereof.

As shown in FIG. 9, interior 145 of supply tank 140 is divided into hot and cold chambers 150 and 151 by a fixed upright divider wall 152 which extends upwardly from bottom wall 142 and transversely between end walls 144 of tank 140. Divider wall 152 is, in the illustrated embodiment, of a double-wall construction and includes a layer of insulation 153 therein. Divider wall 152 includes a pointed upper end 154 which defines a pair of sloped upper surfaces 155. Further, in the illustrated embodiment, divider wall 152 has a height which is substantially less than the overall height of tank 140.

Right end wall 144 (with reference to FIG. 8) includes an opening 160 therein through which the terminal end of feed pipe 34 extends. The mold tank 33 is supported for rotation about axis 56A at the left end thereof via shaft 57 which extends through an opening in an upright support wall 161 of supply tank 140. Support wall 161 extends transversely between side walls 143 (as shown in broken section in FIG. 9), and mounts a bearing 65 on an outwardly facing surface thereof.

It will be appreciated that supply tank 140 may be insulated, and in this regard, the top, bottom, side and end walls thereof may be of a double-wall construction and include a layer of insulation therebetween (not shown).

As best shown in FIGS. 8 and 10, supply tank 140 includes a plurality of heating devices 162 mounted along left or outer end wall 144, which heating devices 162 extend into the interior 145 of supply tank 140, and specifically into hot fluid chamber 150. Calrod electric heaters may be utilized for heating devices 162. The heating devices 162 may be individually controllable or controlled as a group to regulate the temperature of the liquid within hot fluid chamber 150.

The supply tank 140 is provided with a pair of elongate and upright recirculation tubes 163 which are mounted to left end wall 144 by appropriately located support brackets 164. The recirculation tubes 163 are respectively located in the hot and cold fluid chambers 150 and 151 with the lower ends thereof being immersed in the hot and cold liquid. The upper ends of the recirculation tubes 163 are arranged so as to be at the same elevation as the upper open end 59 of feed tube 54 (i.e. the upper surfaces of the upper ends of recirculation tubes 165 and feed tube 54 lie substantially within a common horizontal plane). Each hot and cold fluid chamber 150 and 151 is also provided with an upright screw-type pump 165 mounted to the respective side walls 143 of supply tank 140 by support brackets 166. Pumps 165 each include a vane 170 wound in helix fashion about a vertical axis within a pump tube 170A (FIG. 8). The lowermost end of pump 165 is immersed in the fluid contained within the respective fluid chamber 150 and 151. Screw pumps 165 are conventional and will therefore not be discussed in further detail. The respective upper ends of pumps 165 rotatably mount thereon a hollow funnel member 171. Funnel members 171 each include a lower open end 172 which extends downwardly and terminates at an elevation slightly above the open upper end 59 of feed tube 54 and the respective open upper ends of recirculation tubes 165.

As shown in FIG. 10 each funnel member 171 is rotatable (as indicated by the arrows) in a first direction about a vertical axis 173 into a recirculation position 174 (shown in dotted lines) wherein the lower end 172 of funnel member 171 is positioned closely adjacent the upper end of the respective recirculation tube 163 for communication therewith. Each funnel member 171 is rotatable in the opposite direction into a feed position 175 (also shown in dotted lines) wherein the lower end of funnel member 171 is positioned closely adjacent the open upper end 59 of feed tube 54 for communication therewith. As shown schematically in FIGS. 8 and 9, the driving of each pump 165 and the respective funnel member 171 may be achieved by a conventional electric motor 180 provided adjacent top wall 141 of supply tank 140. In this regard, motor 180 is preferably adapted to continuously drive pump 165 and to selectively drive funnel member 171 between the two positions 174, 175 discussed above via a separate engageable drive path (not shown) emptying multiple drive shafts and a clutch. Alternatively, separate motors may be utilized to drive each funnel member 171 and its respective pump 165.

The operation of the third embodiment of the present invention will now be briefly described.

Tank 140 is provided with liquid via supply ports therein (not shown), and the fluid is heated within hot fluid chamber 150 by heating devices 162 which heat and maintain the fluid at the appropriate fuse temperature. The liquid supplied to cold fluid chamber 151 is cooled and maintained at the appropriate temperature via appropriate coiling devices if necessary, such as conventional cooling coils, although cooling by surrounding environmental air may be sufficient. Each funnel member 171 is initially in the recirculation position 174, and the fluid within each chamber 150 and 151 is recirculated via the respective pump 165 and recirculation tube 163. With the mold arrangement 11 in the downwardly oriented position as shown in FIG. 8, the funnel member 171 associated with hot fluid chamber 150 is rotated into the feed position 175 so that the lower end of funnel member 171 is positioned closely adjacent the open upper end 59 of feed tube 54 (FIGS. 8 and 9). As such, the respective pump 165 supplies heated fluid into funnel member 171, into feed tube 54 and ultimately into mold tank 33 from hot fluid chamber 150. Once the rear surface 46 of mold tool 20 is covered with fluid, the funnel member 171 is rotated away from feed tube 54 and back into the recirculation position 174 such that the lower end thereof is closely adjacent the upper end of the respective recirculation tube 163.

The mold process is continued as with the prior embodiments, and when discharge of the heated fluid from mold tank 33 is desired, the mold tank 33 is rotated from its downwardly oriented position clockwise through an angle of an amount sufficient to empty the mold tank 33 and also position the upper end 59 of feed tube 54 in an angular position 180A (as shown in dotted lines in FIG. 9) which will direct the fluid into the hot fluid chamber 150 of supply tank 140. In this regard, mold tank 33 may preferably be rotated through an angle of about 135° to about 150° to achieve the above.

Cold liquid is supplied to mold tank 33 in a similar manner as discussed above with regard to the supplying of hot fluid thereto. That is, with the funnel member 171 associated with hot fluid chamber 150 in the recirculation position 174, the opposite funnel member 171 is moved into the feed position 175 over the feed tube 54 to thus supply mold tank 33 with cold fluid to cool the mold tool 20. Once the rear surface 46 of mold tool 20 is covered with cold fluid, the funnel member 171 is then rotated back into the recirculation position 174 and away from feed tube 54. With the mold tank 33 in the downwardly oriented position, discharge of the cold fluid from mold tank 33 is achieved by rotating the mold tank 33 counterclockwise to place the feed tube 54 in a downwardly angled position 181 (shown in dotted lines in FIG. 9) to enable discharge of the cold liquid into cold liquid chamber 151 from the now substantially inverted upper end 59 of feed tube 54.

The mold arrangement depicted in FIGS. 8–10 may be utilized with either type of powder box 100 (FIGS. 1–6) or 120 (FIG. 7). In this regard, if the mold arrangement illustrated in FIGS. 8–10 is utilized with a conventional powder box 100, it will be appreciated that closure valves such as valves 121 and 130 associated with the respective feed tube 54 and vent tubes 71 and 72 would be utilized to prevent escape of fluid during the upward rotation of the mold tank 33 which is performed in order to dump the plastic particles into the mold cavity 45.

It is preferred that the heated fluid added to the mold tank 33 be at or above the fuse temperature of the particular plastic particles being utilized. One example of such a temperature is about 235° C. In addition, the temperature of the cold fluid added to the mold tank 33 may for example be approximately 80° C. Other temperatures may be appropriate depending upon the particular plastic utilized and other process parameters. In addition, it is preferred that heated oil be utilized for heating the mold tool 20, for example an oil which is low in density, low in viscosity, and which has a high combustion temperature.

Further, discharging the hot or cold liquid from mold tank 33 is achieved primarily through gravitational forces, and also may not require that mold tank 33 be rotated a full 180°, and Et lesser angle of rotation such as between about 150° and about 120° may be sufficient to discharge the fluid.

Still further, the supplying of the hot and cold liquid to the mold is simple and safe since the supply of oil to and discharged from the mold housing in the embodiments of both FIGS. 1–6 and 8–12 occurs primarily due to gravity. Particularly with respect to the embodiment of FIGS. 8–12, substantially the entirety of the liquid handling system, both in terms of the supply of liquid to and discharge of liquid from the mold housing, and the recirculation of the liquid, occurs primarily due to gravity. While the rotating pump vanes 170 associated with the tubes 170A do effect upward lifting of the respective hot and cold liquids, this upwardly lifting does not cause any significant pressurization of the liquid, but rather the latter is discharged from the upper end of the vane into the funnel 171, with the liquid flowing by gravity through the funnel for discharge either into the mold housing 33 or back into the recirculation tube 163, depending upon the positioning of the funnel. The control of the liquid, specifically the heated liquid, is thus by a system which is essentially nonpressurized.

While agitating of the heat transfer liquid (i.e., hot oil or cooling oil) within the mold housing 33 by angular oscillation of the mold housing is a preferred technique in view of the efficient agitation caused by the sloshing movement, nevertheless it will be appreciated that other techniques can be used for agitating the heat transfer liquid within the mold housing. For example, liquid agitating devices can be positioned interiorly within the mold housing. One example of such arrangement is diagrammatically illustrated in FIG. 6 which illustrates one or more rotatable bladed or vaned wheels 191 disposed interiorly of the housing for agitating the liquid, which bladed wheels can be selectively driven by appropriate motors 192, such as air motors, mounted on the housing.

It will also be appreciated that the molding system 10 according to the present invention is structurally simple and thus less costly that conventional fluid flow systems in which fluid is forced through a mold housing or box from one end thereof to the other as discussed above. In this regard, the pressurized fluid utilized in conventional systems also subjects the mold shell to stress which can shorten the useful life thereof, whereas the present invention utilizes a batch of fluid and agitation thereof to uniformly distribute the fluid over the mold tool.

This application contains subject matter found in U.S. Provisional Application No. 60/085,557 filed May 15, 1998 and entitled "METHOD AND APPARATUS FOR MANUFACTURE OF THIN-WALL ARTICLE FROM PLASTIC PARTICLES". This disclosure of this application is incorporated herein by reference.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A method of molding thermoplastic particles into a thin-walled article in a mold arrangement including a generally hollow mold housing having a thin mold tool provided on one side thereof and having a contoured front mold face which defines a mold cavity, the mold housing along with a back surface of the mold tool defining a fluid chamber within the interior of the mold housing, said method comprising the steps of:

partially filling the mold housing chamber with a defined quantity of heated liquid until the back surface of the mold tool is covered with liquid to heat same;

adding heat to the liquid within the mold housing chamber to maintain the liquid at a predetermined uniform temperature without adding further liquid to the mold housing chamber; and supplying plastic particles for contact with the heated front face of the mold tool to permit adhering and melting of the particles on the front mold face to form a thin-walled article.

2. The method of claim 1 including agitating the liquid within the mold housing chamber, subsequent to said step of partially filling, to effect uniform heat transfer from the heated liquid to the back surface of the mold tool.

3. The method of claim 2 wherein the mold tank is mounted for rotation about a generally horizontal axis, and said step of agitating comprises oscillating the mold housing by partially rotating same back-and-forth about the axis to agitate the liquid within the mold housing chamber.

4. The method of claim 1 including discharging the heated liquid within the mold housing chamber, and then partially filling the mold housing chamber with a quantity of cool liquid to cool the mold tool.

5. The method of claim 1 wherein the mold housing is mounted for rotation about a generally horizontal axis and, prior to said step of partially filling, orienting the mold housing in a downwardly oriented position such that the contoured front mold face faces downwardly with the mold cavity being disposed thereunder, and further including the step of discharging the heated liquid within the mold housing chamber by rotating the mold housing upwardly from the downwardly oriented position a sufficient amount so as to permit discharge of the heated liquid from the mold housing using gravitational forces into a collection tank.

6. The method of claim 1 including providing a material supply container which defines therein a compartment containing a quantity of said plastic particles with said compartment being open at the top and, prior to said step of supplying, method includes moving the container into a position wherein it is disposed below the mold housing and is substantially engaged with the mold housing to enclose the mold cavity, and said step of supplying comprising agitating the particles in the compartment so that same become airborne and are propelled upwardly throughout the mold cavity for contact with the heated front face of the mold tool to permit adhering and melting of the particles on the mold face.

7. The method of claim 6 wherein the agitating of the particles in the compartment is effected by providing a rotating bladed agitating member within the compartment and selectively rotating the agitating member to effect upward agitation and propulsion of the plastic particles.

8. The method of claim 1 wherein the mold housing is mounted for rotation about a generally horizontal axis and, prior to said step of partially filling, said method include orienting the mold housing in a downwardly oriented position such that the contoured front mold face faces downwardly with the mold cavity being disposed thereunder, and said step of supplying comprises rotating the mold housing and mold tool upwardly from the downwardly oriented position a sufficient amount so as to permit dumping of the particles into the mold cavity such that same contact the heated front face of the mold tool to permit adhering and melting of the particles thereon.

9. The method of claim 1 wherein said step of adding heat comprises providing at least one heating device within the chamber of the mold housing.

10. The method of claim 1 wherein prior to said step of partially filling, said method includes orienting the mold housing in a downwardly oriented position such that the contoured front mold face faces downwardly with the mold cavity being disposed thereunder, and the mold arrangement includes a fluid holding tank and an upright feed tube connected to the mold housing and in communication with the mold housing chamber, said feed tube having an open free end which is oriented upwardly when the mold housing is in the downwardly oriented position, and the mold housing is mounted for rotation about a generally horizontal axis, said method further comprising, subsequent to said step of partially filling, discharging the heated liquid within the mold tank chamber by rotating the mold housing upwardly from the downwardly oriented position thereof a sufficient amount so as to substantially invert the feed tube and permit discharge of the heated liquid through the open free end thereof into the fluid holding tank.

11. The method of claim 1 wherein said step of partially filling comprises adding to the mold housing chamber a defined quantity of liquid which is preheated to a predetermined temperature.

12. A method of molding thermoplastic particles into a thin walled article in a mold arrangement including a generally hollow and rotatable mold housing having a thin mold tool provided on one side thereof and having a contoured front mold face which defines a mold cavity, the mold housing along with a back surface of the mold tool defining a liquid chamber within the interior of the mold housing, said method comprising the steps of:

positioning the mold housing in a position wherein the front face of the mold tool faces generally downwardly;

partially filling the mold housing chamber with a batch of heated liquid of a defined quantity until the back surface of the mold tool is covered with liquid to heat same;

adding heat to the liquid within the mold housing chamber to maintain the liquid therein at a predetermined uniform temperature without adding further liquid to the mold housing chamber;

supplying plastic particles for contact with the heated front face of the mold tool to permit adhering and melting of the particles thereon to form a thin walled article; and discharging the heated liquid from the mold housing chamber using gravitational forces.

13. A method according to claim 12 including the step of:

rotating the mold housing into a second position wherein the front face of the mold tool faces generally upwardly to permit discharging of the heated liquid from the mold housing chamber by gravitational forces.

14. A method according to claim 12, including the step of:

agitating the heated liquid within the mold housing chamber to effect uniform heating of the mold tool prior to supplying plastic particles for contact with the heated front face of the mold tool.

15. The method according to claim 14, wherein agitating of the heated liquid in the mold housing chamber is effected by angularly oscillating the mold housing back and forth about a generally horizontal axis.

16. The method according to claim 14, wherein the supplying of plastic particles for contact with the heated front face of the mold tool includes the steps of:

providing a powder box defining an upwardly-opening compartment containing a quantity of said plastic particles;

attaching said powder box to said mold housing when the latter is in the position wherein the front face of the mold tool faces generally downwardly so that the front face of the mold tool is disposed above the powder-containing compartment; and agitating the plastic particles within the compartment to cause the particles to be propelled upwardly for contact with the heated front face of the mold tool.

17. A method according to claim 12, including the steps of:

partially filling the mold housing chamber with a batch of cooling liquid, after discharging the heated liquid from the mold housing chamber, to at least partially cover the back surface of the mold tool to effect cooling thereof;

discharging the cooling liquid from the mold housing chamber using gravitational forces; and removing the formed article from the front face of the mold tool.

18. A method of molding thermoplastic particles into a thin-walled article in a mold arrangement including a hollow mold housing having a mold tool provided on one side thereof and having a front face which defines a mold cavity, the mold housing along with a back surface of the mold tool defining a closed fluid chamber, said method comprising the steps of:

adding a batch of liquid to the fluid chamber so as to cover the back surface of the mold tool and heat same;

agitating the liquid within the fluid chamber to effect uniform heat transfer from the liquid to the mold tool;

adding heat to the liquid within the fluid chamber without adding further liquid by providing an electric heating element disposed within the fluid chamber to maintain the liquid at a predetermined temperature; and contacting the heated front face of the mold tool with plastic particles to form a thin-walled article.

19. The method of claim 18 wherein said step of adding heat is performed solely with the electric heating element and without adding additional liquid to the fluid chamber.

20. The method of claim 19 including providing a plurality of electric heating elements within the fluid chamber to add heat to the liquid within the fluid chamber and maintain same at a predetermined temperature.

21. The method of claim 18 wherein said step of agitating includes angularly oscillating the mold housing in a back-and-forth motion about a generally horizontal axis.

22. The method of claim 18 wherein said step of contacting further includes providing a supply container containing a quantity of the plastic particles and agitating the particles within the supply container to propel same towards the heated front face of the mold tool for contact therewith.

23. The method of claim 22 wherein said step of contacting includes moving the supply container into a position wherein it is disposed below the mold housing and engaged therewith to enclose the mold cavity, and agitating the plastic particles within the supply container to propel same upwardly throughout the mold cavity for contact with the heated front face of the mold tool to permit adhering and melting of the particles on the front face thereof.

* * * * *

UNITED STATES PATENT AND TRADEMARK OFFICE
CERTIFICATE OF CORRECTION

PATENT NO. : 6,284,182 B1
DATED : September 4, 2001
INVENTOR(S) : Douglas J. McNally It is certified that error appears in the above-identified patent and that said Letters Patent is hereby corrected as shown below:

Column 17,
Line 3, after "supplying," insert -- said --.
Line 19, change "include" to -- includes --.

Column 18,
Lines 17 and 40, change "A" to -- The --.
Line 26, change "claim 14" to -- claim 12 --.
Line 65, after "predetermined" insert -- uniform --.

Signed and Sealed this

Sixth Day of August, 2002

Attest:

JAMES E. ROGAN
Attesting Officer
Director of the United States Patent and Trademark Office